United States Patent
Heidkamp et al.

(10) Patent No.: US 11,281,085 B2
(45) Date of Patent: Mar. 22, 2022

(54) ILLUMINATION DEVICE FOR A PROJECTOR HAVING A LIGHT MODULATOR

(71) Applicant: Carl Zeiss Jena GmbH, Jena (DE)

(72) Inventors: Marcus Heidkamp, Jena (DE); Dirk Doering, Erfurt (DE); Axel Krause, Jena (DE); Peter Klopfleisch, Jena (DE); Alexander Gratzke, Jena (DE); Bryce Anton Moffat, Jena (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 16/684,587

(22) Filed: Nov. 14, 2019

(65) Prior Publication Data

US 2020/0159099 A1    May 21, 2020

(30) Foreign Application Priority Data

Nov. 15, 2018   (DE) .......................... 102018128743.7

(51) Int. Cl.
*G03B 21/20* (2006.01)
*G02B 5/20* (2006.01)
*G02B 27/14* (2006.01)

(52) U.S. Cl.
CPC .......... *G03B 21/204* (2013.01); *G02B 5/208* (2013.01); *G02B 27/141* (2013.01); *G03B 21/20* (2013.01); *G03B 21/208* (2013.01); *G03B 21/2066* (2013.01)

(58) Field of Classification Search
CPC ............ G02B 5/208; G02B 27/14–141; G03B 21/20–2086; G03B 33/12
See application file for complete search history.

(56) References Cited

U.S. PATENT DOCUMENTS

| | | | |
|---|---|---|---|
| 9,348,207 B2 | 5/2016 | Yamamoto | |
| 9,599,316 B2* | 3/2017 | Yamada | F21V 9/08 |
| 2006/0244929 A1 | 11/2006 | Sawai et al. | |
| 2007/0064202 A1 | 3/2007 | Moffat et al. | |
| 2011/0116261 A1 | 5/2011 | Brukilacchio et al. | |
| 2013/0050654 A1 | 2/2013 | Hu et al. | |

(Continued)

FOREIGN PATENT DOCUMENTS

WO     2017067781 A1    4/2017

OTHER PUBLICATIONS

Stephan Bissinger et al.; "High Resolution LED-Projector Stimulating Night Vision Devices Using Infrared Radiation"; Image 2010 Conference, Scottsdale, Arizona; Jul. 2010; 6 pages.

(Continued)

*Primary Examiner* — Jason M Han
(74) *Attorney, Agent, or Firm* — Skaar Ulbrich Macari, P.A.

(57) ABSTRACT

An illumination apparatus includes a first solid-state-based illumination module, a second solid-state-based illumination module, and a superposition unit, which couples first and the second luminescence radiation into an illumination beam path, in which said radiation is guided up to the end of the illumination beam path in order to illuminate a light modulator. A filter unit which filters light with a second color from the first luminescence radiation with a first color and from the second luminescence radiation such that light with the first and second color is present at the end of the illumination beam path.

19 Claims, 6 Drawing Sheets

(56) References Cited

U.S. PATENT DOCUMENTS

| | | |
|---|---|---|
| 2013/0100639 A1 | 4/2013 | Li et al. |
| 2015/0002824 A1 | 1/2015 | Kasugai et al. |
| 2016/0054574 A1 | 2/2016 | Huang |
| 2016/0084452 A1 | 3/2016 | Hikmet et al. |
| 2016/0139328 A1 | 5/2016 | Hikmet et al. |
| 2017/0139113 A1 | 5/2017 | Peeters |
| 2018/0038574 A1 | 2/2018 | Hikmet et al. |
| 2018/0106460 A1 | 4/2018 | Van Bommel et al. |
| 2019/0235369 A1 | 8/2019 | Janssens et al. |

OTHER PUBLICATIONS

Leaflet Philips: Digital Projection Lighting, HLD LED technology. Where brilliance meets intelligence; Discover Philips HLD LED technology; 2018; 2 pages.

* cited by examiner

ILLUMINATION DEVICE FOR A PROJECTOR HAVING A LIGHT MODULATOR

PRIORITY

This application claims the benefit of German Patent Application No. 10 2018 128 743.7, filed on 15 Nov. 2018, which is hereby incorporated herein by reference in its entirety.

FIELD

The present invention relates to an illumination apparatus for a projector comprising a light modulator.

BACKGROUND

In projectors, such as digital projectors, the light modulator can be illuminated sequentially in time by light of different colors from different wavelength regions in order to produce color component images sequentially in time, said color component images being perceivable as a multi-colored image by an observer only in the case of a superposition in time.

Often used in the past as a light source for this is a high-pressure mercury lamp, from the light of which red, green and blue light is filtered out sequentially in time by color filters and used for illuminating the light modulator.

Further, the use of light-emitting diodes, laser illumination and phosphor-converted laser-illumination is known. As a rule, compromises have to be found here between the costs, the luminous flux, the stability and further properties of the light sources, such as, e.g., service life and aging behavior, optical artifacts such as speckle in the case of laser illumination, or else approval-relevant questions (laser safety), etc.

SUMMARY

The disclosure includes an illumination apparatus for a projector comprising a light modulator, said illumination apparatus requiring as little servicing as possible and having a long service life.

Contrary to the previously known solutions, the use of the first and second solid-state-based illumination module unifies two solid-state-based illumination modules (in particular, a solid-state module whose radiation is used for, e.g., green light for illuminating the light modulator and a solid-state module whose radiation is used for, e.g., yellow light for illuminating the light modulator), even though large parts of the luminous fluxes are lost during the illumination of the light modulator on account of the large spectral overlap of the two solid-state modules. However, despite the relatively high losses, a higher luminous flux still is possible than in the case of conventional LEDs on account of the large spectral overlap range.

The spectra (or the power spectral densities) of the first and second luminescence radiation may overlap. By way of example, the spectrum of the first luminescence radiation may cover more than 50% of the wavelength range (or else more than 60, 70 or 80%) and less than 100% (preferably less than 95% or else 90%) of the spectrum of the second luminescence radiation. In particular, it is preferable for the spectrum of the second luminescence radiation to have a higher intensity in the red wavelength range than the spectrum of the first luminescence radiation. However, it is also possible for the spectra of the first and second luminescence radiation to be the same, corresponding to an overlap of 100%.

Consequently, two solid-state-based illumination modules are combined, the spectra (or power spectral densities) of which have a significant overlap. However, an automatic result thereof is that very much luminous power (or radiant flux) of the solid-state-based illumination modules cannot be used in the case of such a combination.

Thus, for example, the first spectrum may have a maximum at a first wavelength and the second spectrum may have a maximum at a second wavelength, the second wavelength being longer than the first wavelength. The first wavelength can correspond to the color green and the second wavelength can correspond to the color yellow, wherein the first spectrum can be used to produce a green color (first color) and the second spectrum can be used to produce a red color (second color).

By way of example, in this case, approximately 70%, 75%, 80%, 85% or 90% of the first luminous power provided by the first luminescence radiation can be used for the light with the first color. Consequently, there is a loss in this case of 30%, 25%, 20%, 15% or 10% of the first luminous power provided. By way of example, in the case of the second luminescence radiation, at most 30%, 25%, 20% or 15% of the second luminous power provided can be used for the light with the second color. Consequently, there is a loss of 70%, 75%, 80% or 85% in this case.

This shows that such a combination of solid-state-based illumination modules is usually considered unwanted. However, what is exploited according to the invention is that the component of the spectrum of the second luminescence radiation for red light is higher than that of the first luminescence radiation, and so higher intensities for red light are present. This advantage is used together with the advantage that the second solid-state-based illumination module is substantially more stable with respect to color and brightness in comparison with an LED that emits red light. Therefore, unusually, the high loss of the second luminescence radiation is accepted in order to obtain an intensity that is as high as possible with, at the same time, a very stable color (i.e., wavelength) and brightness.

Consequently, a red LED, which would usually be selected, is dispensed with. Such a red LED would have less overlap with the first luminescence radiation and would therefore be able to be integrated in a more efficient and cost-effective manner. According to the invention, this efficient and cost-effective integration is dispensed with and, instead, there is acceptance that much luminous power of the second solid-state-based illumination module is present as a loss in order to be able to provide the light with the second color with relatively high intensity and stable color and brightness.

This is particularly advantageous if a plurality of such illumination apparatuses are provided for a plurality of projectors, which, together, present a larger image in overlapping fashion. In this case, color deviations between the different projectors would very easily be perceived as bothersome.

Further, the second luminescence radiation even more advantageously has a higher component in the infrared wavelength range (in particular, in the near infrared wavelength range) than the first luminescence radiation. In particular, the filter unit can have such an embodiment that the latter passes on this infrared component of the second luminescence radiation. The latter can then be used for image presentation, in particular for night-vision simulations or projections.

Light with the first or second color are preferably different colors. In particular, this may relate to so-called primary colors, such as, e.g., red and green.

Moreover, the solid-state-based illumination modules a more stable (in particular in terms of color point and power) with respect to thermal influences, load changes and pulsed operation. Additionally, there is no need for active regulation of the solid-state-based illumination modules. This saves parts (e.g., sensors). There are fewer outages and the production costs are lower. Further, the degree of use of the light modulator is increased since no time is needed for measuring the output power.

In particular, in the solid-state-based illumination modules, the first and second luminescent material can each be a dye-doped solid-state rod. The first and/or second solid-state light source can comprise, in particular, one or more LEDs, one or more blue LEDs and, particularly preferably, one or more blue high-power LEDs. The dye-doped solid-state rods can then emit a relatively broad spectrum that has been shifted to the green to red spectral range, wherein the maximum may lie at a green wavelength or at a yellow wavelength.

By way of example, the solid-state-based illumination modules can be procured from Signify (previously Philips Lighting). In particular, the solid-state-based illumination modules are distinguished by a long service life and slow aging. Additionally, the luminous power is available virtually immediately. No significant warm-up time is required in comparison with previously known high-pressure mercury lamps.

Further, the solid-state-based illumination modules require less servicing and there are shorter downtimes. In particular, there is no risk of lamps bursting and the use of mercury is no longer required, which is more environmentally friendly.

The solid-state-based illumination modules can be operated independently of position, leading to an illumination apparatus that can be used more flexibly.

In particular, the first or second solid-state-based illumination module for producing the luminescence radiation can be free from moving parts. By way of example, a color wheel is thus no longer required to produce the desired color or the desired colors, unlike in the previous case. Hence, good durability is ensured.

The filter unit may comprise a dichroic beam unifier, which is part of the superposition unit at the same time. Naturally, other types of beam unification are also possible, e.g., in diffractive (by gratings) and/or refractive (by prisms) fashion.

The first and/or second solid-state light source may contain an LED. In particular, the first and/or second solid-state light source can emit the excitation radiation at a wavelength from the range of 200 to 490 nm.

Further, the illumination beam path may comprise a light mixing rod or integrator, through which the first and the second luminescence radiation passes. The end of the light mixing rod may form the end of the illumination beam path.

Further, the illumination apparatus may comprise a third illumination module emitting third radiation, wherein the third radiation is coupled into the illumination beam path by means of the superposition unit. By way of example, the third illumination module may comprise an LED. The third radiation can be light with a third color (e.g., a third primary color), which is different from the first color and from the second color. In particular, the third radiation may have a wavelength in the blue wavelength range of visible light.

The illumination apparatus can be embodied in such a way that a paraxial focus of the third radiation lies in the light mixing rod and said paraxial focus is spaced apart from a paraxial focus of the first and/or second luminescence radiation. In particular, the paraxial foci of the first and second luminescence radiation may be spaced apart from one another and all may lie within the light mixing rod.

The first solid-state-based illumination module may comprise two illumination partial modules (preferably with the same construction), the emitted partial module luminescence radiations of which are combined to a first luminescence beam, from which the filter unit filters the light with the first color.

The two partial module luminescence radiations can extend adjacent to one another and together strike a filter element of the filter unit, which filters out the light with the first color. Alternatively, it is possible for the partial module luminescence radiations to each strike separate filter elements of the filter unit, wherein the filter elements filter out light with the first color therefrom in each case and the light with the first color is subsequently combined to form a common beam with the first color.

Similarly, the second solid-state-based illumination module may comprise two illumination partial modules (preferably with the same construction), the emitted partial module luminescence radiations of which are combined to a second luminescence beam, from which the filter unit filters the light with the second color.

Here, the two partial module luminescence radiations can extend adjacent to one another and together strike a filter element of the filter unit, which filters out the light with the second color. Alternatively, the partial module luminescence radiations can each strike separate filter elements of the filter unit, wherein the filter elements filter out light with the second color therefrom in each case and combine the light with the second color subsequently to form a common beam with the second color.

Further, the third illumination module may comprise two illumination partial modules, the emitted third radiations of which are combined to form a third beam. If necessary and/or desired, the light with a third color can be filtered from the third beam.

Once again, the third beams may extend adjacent to one another and be coupled together into the illumination beam path. Alternatively, the third beams may be coupled into the beam path at different locations. Filtering may also be carried out during the input coupling, if desired.

The input coupling of the beams produced by the illumination partial modules can be implemented in wavelength-dependent fashion by way of appropriate wavelength-dependent beam unification elements (e.g., dichroic beam unifiers, gratings, prisms, etc.) and/or by way of a geometric beam unification. Thus, the illumination apparatus may comprise, e.g., a first and a second light source unit, which each emit light with a first and with a second color (and preferably with a third color as well) in an output beam sequentially in time. Then, the two output beams are geometrically combined to form a beam with a greater cross section and coupled into the illumination beam path. The light source units may each comprise a first and second solid-state-based illumination partial module, which, in principle, may have the same construction as the first or the second solid-state-based illumination module.

Further, a projector is provided with a light modulator and an illumination apparatus according to the invention (including all the aforementioned developments). By way of example, such a projector can be used in flight simulation (e.g., in a flight simulator), as a planetarium projector or as any other projector.

In particular, the light modulator is a planar light modulator and can be embodied, e.g., as a tilt mirror matrix, LCD module or else LCoS module. Moreover, the projector may comprise a control unit for controlling the modulator and the illumination modules, and a projection optical unit that projects the image produced by means of the light modulator onto a projection surface.

In particular, the projector is embodied in such a way that the various component images are produced sequentially in time. Here, the component images are produced so quickly in succession that these can no longer be resolved individually by a user who, instead, only still perceives a superposition of the component images as a multi-colored image. To this end, the control unit can actuate the illumination modules in such a way that these are activated and deactivated (switching in the kHz range is possible) sequentially in time. Hence, the modulator can be illuminated with different colors sequentially in time, as a result of which color partial images can be produced, which the user then can only still perceive in superposition. Naturally, at least two illumination modules may also be activated simultaneously for certain phases should this be desired, e.g., for a higher luminous flux.

The projector may comprise two light modulators disposed in succession. In this case, in particular, provision is made of a modulator optical unit that images the first light modulator onto the second light modulator. In particular, the modulator optical unit can be embodied as a 1:1 optical unit. The maximum contrast of the projector is increased by the provision of two light modulators switched in succession.

It goes without saying that the aforementioned features and those yet to be explained below can be used not only in the combinations specified but also in other combinations or on their own, without departing from the scope of the present invention.

The invention will be explained in more detail below on the basis of exemplary embodiments, with reference being made to the attached drawings, which likewise disclose features essential to the invention. These exemplary embodiments serve merely for elucidation and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and developments which are described for one of the exemplary embodiments may also be applicable to other exemplary embodiments. In order to avoid repetition, the same elements or corresponding elements in the various figures are denoted by the same reference signs and are not explained a number of times.

Figure 1:
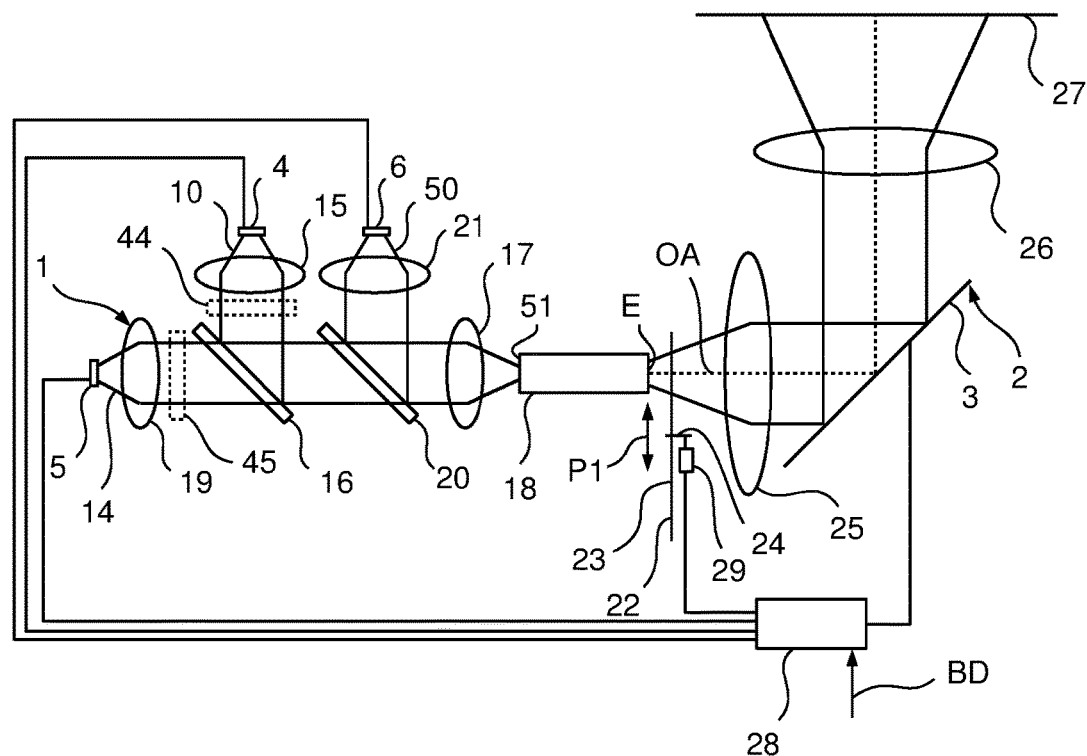
FIG. 1 is a schematic illustration of a first exemplary embodiment of the illumination module according to the invention in a projector according to the invention.

While the invention is amenable to various modifications and alternative forms, specifics thereof have been shown by way of example in the drawings and will be described in detail. It should be understood, however, that the intention is not to limit the invention to the particular example embodiments described. On the contrary, the invention is to cover all modifications, equivalents, and alternatives falling within the scope of the invention as defined by the appended claims.

DETAILED DESCRIPTION

The invention is explained in yet more detail below with the aid of embodiment examples with reference to the attached drawings, which also disclose features essential to the invention. These embodiment examples merely serve the purpose of illustration and are not to be interpreted as limiting. For example, a description of an embodiment example with a plurality of elements or components is not to be interpreted to the effect that all of these elements or components are necessary for the implementation. Rather, other embodiment examples can also contain alternative elements and components, fewer elements or components or additional elements or components.

Elements or components of different embodiment examples can be combined with each other, unless otherwise indicated. Modifications and alterations which are described for one of the embodiment examples can also be applicable to other embodiment examples. To avoid repetitions, the same or corresponding elements are given the same reference numbers in different figures and are not explained repeatedly.

In the embodiment shown in FIG. 1, the illumination apparatus 1 is provided in a projector 2, the latter comprising a light modulator 3 (e.g., a tilt mirror matrix).

The illumination apparatus 1 comprises a first solid-state-based illumination module 4, a second solid-state-based illumination module 5 and a third illumination module 6.

Figure 2:
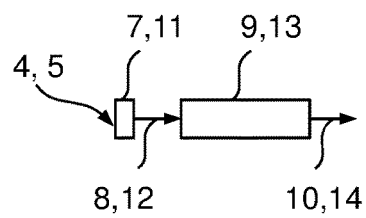
FIG. 2 is a schematic illustration of the first and second solid-state-based illumination module.

As indicated schematically in FIG. 2, the first solid-state-based illumination module 4 comprises a first solid-state light source 7, which is embodied, e.g., as an LED (e.g., a blue high-power LED), as a laser diode or as an organic LED and which emits first excitation radiation 8. Further, the first solid-state-based illumination module 4 comprises a first luminescent material 9 (e.g., a dye-doped solid-state rod), on which the first excitation radiation 8 is incident, wherein a first luminescence radiation 10 is produced and emitted. The first solid-state light source 7 can emit the first excitation radiation 8, e.g., with a wavelength from the range of 200 to 490 nm. The first luminescence radiation 10 has a first spectrum, wherein the maximum thereof lies at the green wavelength of 560 nm, as illustrated schematically in FIG. 3 by the curve K1 with a solid line. Here, in FIG. 3, the power spectral density (along the vertical axis) is plotted as a function of the emitted wavelength (along the horizontal axis).

The first solid-state-based illumination module 4 may comprise a plurality of first solid-state light sources 7, the excitation radiations 8 of which are used to produce the luminescence radiation 10.

In principle, the second solid-state-based illumination module 5 has the same construction as the first solid-state-based illumination module 4, and so reference can be made, once again, to the schematic illustration in FIG. 2. Thus, the second solid-state-based illumination module 5 comprises a second solid-state light source 11, which may contain an LED, a laser diode or an organic LED and which emits a second excitation radiation 12 with a wavelength from the range of, e.g., 200 to 490 nm. Further, the second solid-state-based illumination module 5 comprises a second luminescent material 13, which is impinged by the second excitation radiation 12 and which emits the second luminescence radiation 14 as a consequence, the second spectrum of said second luminescence radiation being plotted in FIG. 3 as curve K2 with a dashed line. The second spectrum has its maximum at the yellow wavelength of 569 nm.

Figure 3:
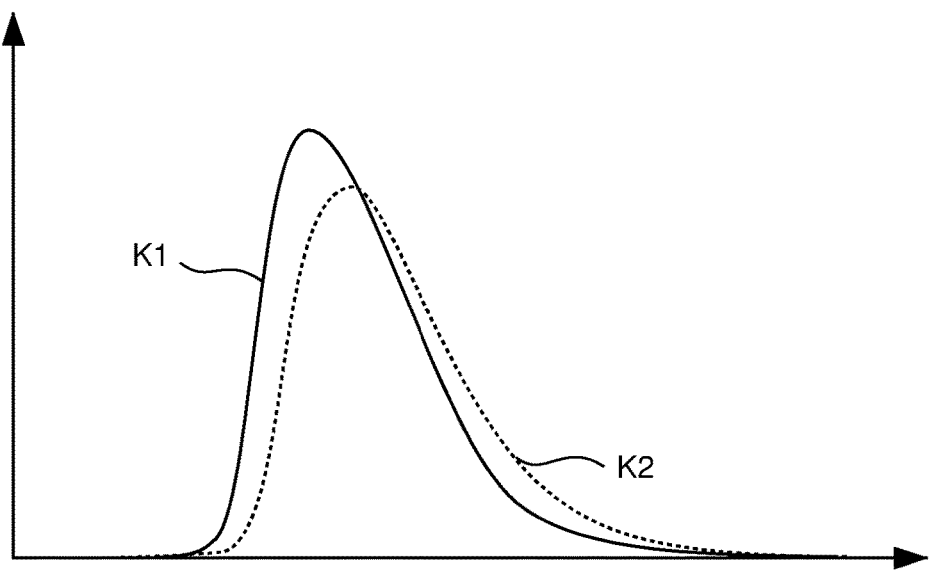
FIG. 3 is a schematic illustration of the spectra of the first and second illumination module.

As may be gathered from the illustration in FIG. 3, there is a significant spectral overlap region of the two different spectra K1 and K2. However, it is also evident that the second luminescence radiation 14 has a higher emission in the red spectral range in comparison with the first luminescence radiation 10.

The first luminescence radiation 10 of the first solid-state-based illumination module 4 passes through a first condenser optical unit 15, strikes a first dichroic beam unifier 16, which deflects the desired green component of the collimated first luminescence radiation 10 to a second dichroic beam unifier 20, from where it is transmitted to a focusing optical unit 17 which focuses the radiation in an integrator 18 (which may be embodied as a light mixing rod, for example).

The second luminescence radiation 14 passes through a second condenser optical unit 19 and the first dichroic beam unifier 16, which, from this, only transmits the desired red component of the second luminescence radiation 14. This red component of the second luminescence radiation 14 passes through the second dichroic beam unifier 20 and is then focused into the integrator 18 by the focusing optical unit 17.

Figure 4:
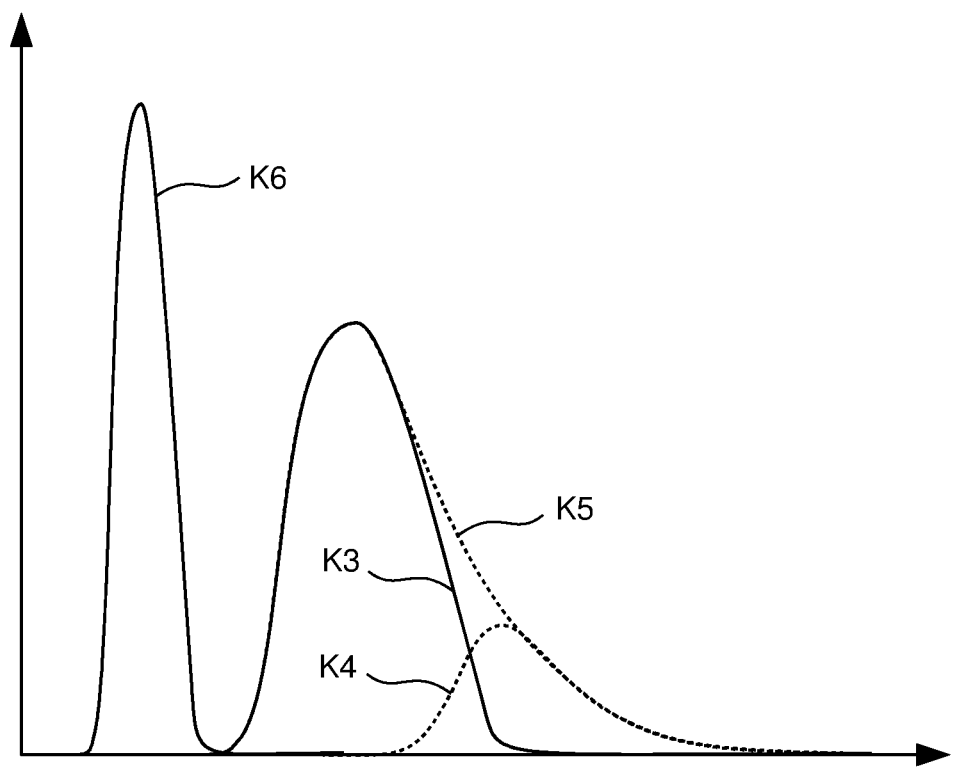
FIG. 4 is a schematic illustration of the spectra in the region of the entry surface of the integrator.

FIG. 4 illustrates the effective spectra after the beam unification (e.g., upon entry into the light mixing rod 9) in the same way as in FIG. 3, with the curve K3 showing the remaining spectrum of the first luminescence radiation 10 after deflection by the first beam unifier 16 or upon entry into the integrator 18, the curve K4 showing the remaining spectrum of the second luminescence radiation 14 after passing through the first beam unifier or upon entry into the integrator 18 and the curve K5 showing the summed spectrum of the curves K3 and K4. A large part of the luminous flux (specifically, the green spectral range) of the luminescence radiation 14 of the second illumination module 5 is not used. However, the remaining red spectrum (curve K4) is nevertheless advantageous.

The third illumination module 6 emits a third radiation 50 with a blue wavelength, which is deflected through a third condenser optical unit 21 and, thereupon, by the second dichroic beam unifier 20 to the focusing optical unit 17 and focused by the latter into the integrator 18. The spectrum of the third radiation 50 following the deflection by the second beam unifier 20 or upon entry into the integrator 18 is illustrated schematically in FIG. 4 as curve K6.

Consequently, the first to third radiation 10, 14, 50 are superposed following the second beam unifier 20 and all pass the focusing optical unit 17 and the integrator 18 together, emerging from the end E of said integrator. Therefore, the beam path from the second beam unifier 20 to the end E can also be referred to as illumination beam path. Naturally, the illumination beam path may also already start at the first beam unifier 16 since the first beam unifier 16 superposes the first and second luminescence radiation 10, 14.

Figure 5:
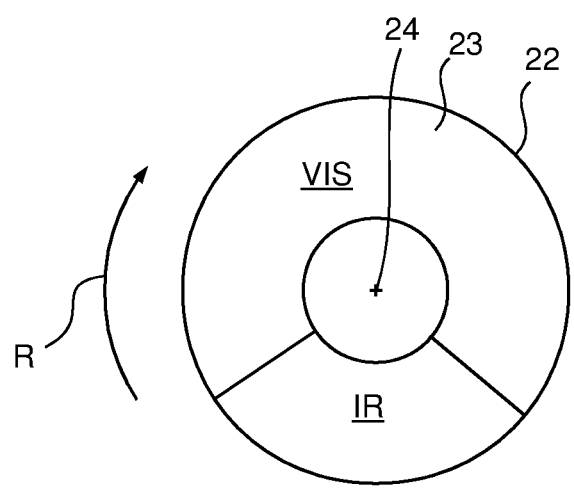
FIG. 5 is a plan view of the filter wheel of the illumination module of FIG. 1.

A filter wheel 22 comprising a filter surface 23 is disposed downstream of the integrator 18. By way of example, the filter surface 23 can have a ring-shaped embodiment, as is evident in the plan view of FIG. 5, and comprises two surface segments lying next to one another in the rotation direction R, it being possible to refer to said surface segments as first surface segment VIS and second surface segment IR. The first surface segment VIS transmits light from the visible wavelength range and radiation from the infrared range. The second surface segment only transmits radiation from the infrared range and no light from the visible wavelength range.

The filter surface 23 of the filter wheel 22 is disposed perpendicular to, or at an angle unequal to 90° with respect to, the optical axis OA of the illumination apparatus 1 such that only a part of the filter surface 23 stands in the illumination beam path at all times. The filter wheel 22 is embodied in such a way that the filter surface 23 is rotatable about an axis 24, wherein the axis 24 may extend parallel to the optical axis OA or include an angle of greater than 0° with the optical axis OA (and consequently no longer be parallel to the optical axis OA).

Further, the projector 2 comprises an illumination optical unit 25 disposed downstream of the integrator 18 (and optionally downstream of the filter wheel 22 if the latter is positioned in the beam path), said illumination optical unit directing the light coming from the integrator 18 onto the light modulator 3 in such a way that the latter is illuminated as uniformly as possible.

The projector 2 comprises a control unit 28, which actuates the light modulator 3 and the three illumination modules 4-6 (and, where applicable, a drive 29 of the filter wheel 22) on the basis of the supplied image data BD in such a way that the desired images are projected. To this end, the three illumination modules 4-6 can be actuated in such a way that they are activated and deactivated successively in time in order to successively illuminate the light modulator 3 in time with red, green and blue light. The light modulator 3 modulates the light in a manner known per se such that red, green and blue color component images are produced and the light of the color component images used for image presentation (so-called one light) is projected by way of a projection optical unit 26 onto a projection surface 27 in order to produce, at said location, an image to be presented. Here, the illumination modules 4-6 are actuated by means of the control unit 28 in such a way that the red, green and blue color component images produced by means of the modulator 3 are produced so quickly in succession and presented by means of the projection optical unit 26 on the projection surface 27 that an observer cannot resolve these in time and consequently perceives the superposition as a multi-color image.

The third radiation 50 of the third illumination module 6, which may comprise, e.g., an LED, is used for the blue color component image. Naturally, the third illumination module 6, too, can be embodied as, e.g., a solid-state-based illumination module. The green component of the first luminescence radiation 10 is used for the green color component image. The corresponding components of the second luminescence radiation 14 are used for the red color component image.

By way of example, the filter wheel 22 serves to produce infrared images and flight simulators and can be moved out of the beam path, as indicated by the double-headed arrow P1. Thus, the illumination apparatus 1 according to the invention or the projector 2 according to the invention can be used in a flight simulator in order to be able to train night-vision conditions using a night-vision device. To this end, use can be made, e.g., of the infrared component of the first and/or second luminescence radiation 10, 14, with the filter wheel 22 projecting into the beam path, as illustrated schematically in FIG. 1. Preferably, filters not plotted here can be used to block the infrared component of the illumination modules 4-6, the infrared component of which should not be used for producing the infrared images. On account of the rotating filter wheel, it is consequently possible, for example, to simultaneously produce and project a desired infrared image and an image with the light from the visible wavelength range. Consequently, it is possible to produce the desired infrared images, which a user of the flight simulator can perceive using their night-vision device. By way of example, flying and operating an aircraft or helicopter can be trained using such a flight simulator.

The filter wheel 22 can be moved out of the beam path when no infrared images are intended to be produced. In this case, the light leaving the integrator 18 directly strikes the illumination optical unit 25.

Figure 6:
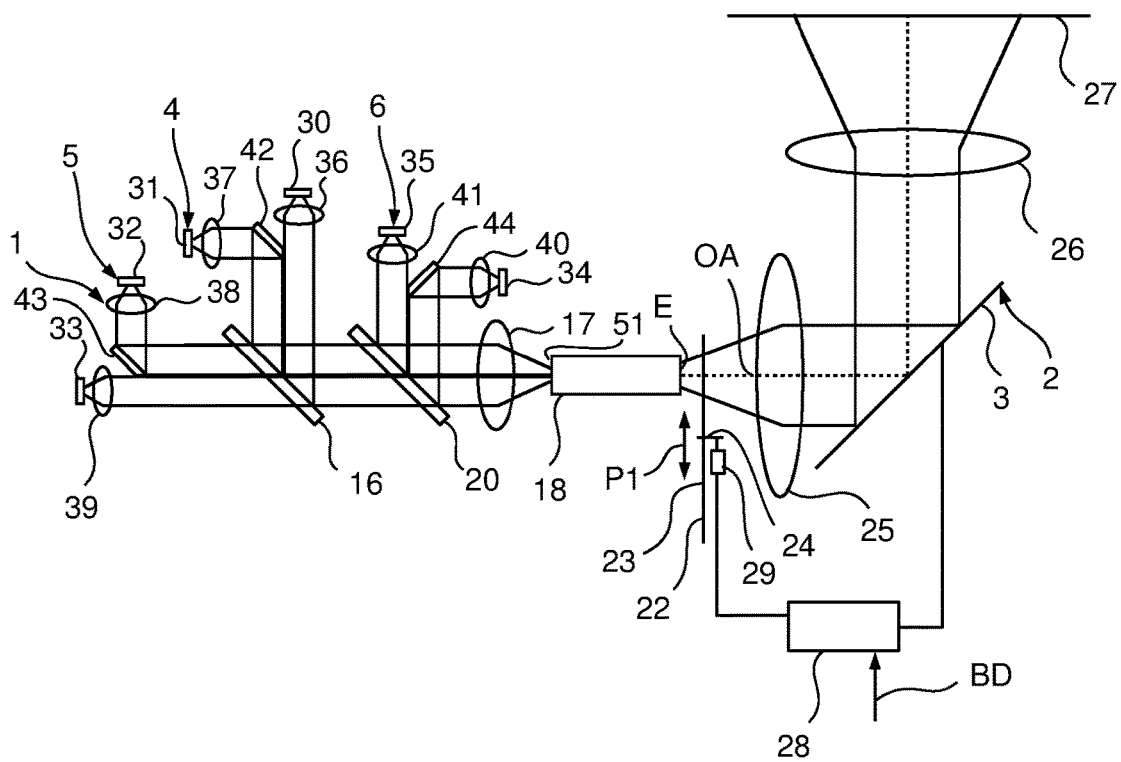
FIG. 6 is a further exemplary embodiment of the illumination module according to the invention.

FIG. 6 shows a modification of the embodiment of FIG. 1. In this modification, the illumination modules 4-6 illustrated in FIG. 6 have, e.g., a lower etendue than in FIG. 1, and so two separate illumination partial modules are provided in each case for the first, second and third illumination module 4-6. Thus, the first solid-state-based illumination module 4 comprises a first and a second solid-state-based illumination partial module 30, 31. The second solid-state-based illumination module 5 comprises a third and a fourth solid-state-based illumination partial module 32, 33 and the third illumination module 6 comprises a fifth and a sixth illumination partial module 34, 35.

Once again, the illumination partial modules 30-35 can be actuated by the control unit 28 and the corresponding connection lines are not plotted so as to simplify the illustration.

In principle, the first to fourth illumination partial module 30-33 have the same construction as the first or second solid-state-based illumination module 4, 5 according to FIGS. 1 and 2. In principle, the fifth and sixth illumination partial module 34, 35 have the same construction as the third illumination module according to FIG. 1. Each illumination partial module 30-35 comprises a collimator optical unit 36 to 41 and three deflection elements 42 to 44 are provided in order to steer the corresponding radiation of the corresponding illumination partial module 30, 33 and 34 to the corresponding dichroic beam unifier 16, 20, as indicated in FIG. 6. The first and second illumination partial module 30, 31 each emit a luminescence radiation according to curve K1 in FIG. 3. The third and fourth illumination partial module 32 and 33 each emit a curve K2 in FIG. 3 corresponding to a luminescence radiation. Further, the fourth and fifth illumination partial module 34 and 35 emit the same radiation in the blue wavelength range as the third illumination module 6.

In a modification, not shown, the third illumination partial module 6 according to FIG. 1 is provided in place of the fifth and sixth illumination partial module 34, 35.

Figure 7:
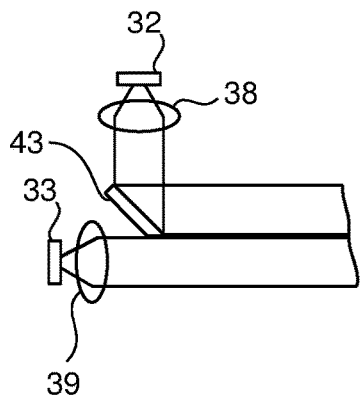
FIG. 7 is a magnified detailed view of the third and fourth illumination partial module.
Figure 8:
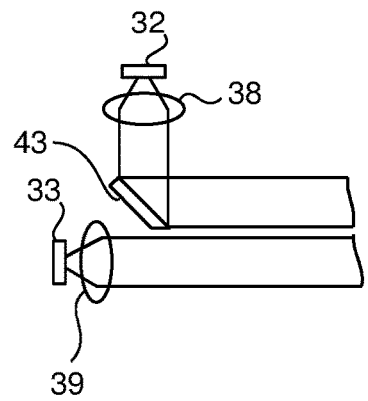
FIG. 8 is a magnified detailed view of a modification of the third and fourth illumination partial module.

As illustrated in FIG. 6 and in the magnified view in respect of the illustration in FIG. 7 for the third and fourth illumination partial module 32, 33, the beams of the illumination partial modules 32 and 33 are placed as tightly as possible next to one another. However, a finite distance may also be provided, as indicated in FIG. 8. In the exemplary embodiment described in FIG. 6, the first and second illumination partial module 30, 31, the third illumination partial module 32, 33 and the fifth and sixth illumination partial module 34 and 35 each emit radiation with the same spectrum. Thus, light sources with a smaller etendue but the same spectrum are used to produce a beam with a greater diameter. These beams with a greater diameter are then superposed by means of the beam unifiers 16, 20. Consequently, a wavelength-dependent superposition is carried out.

Figure 9:
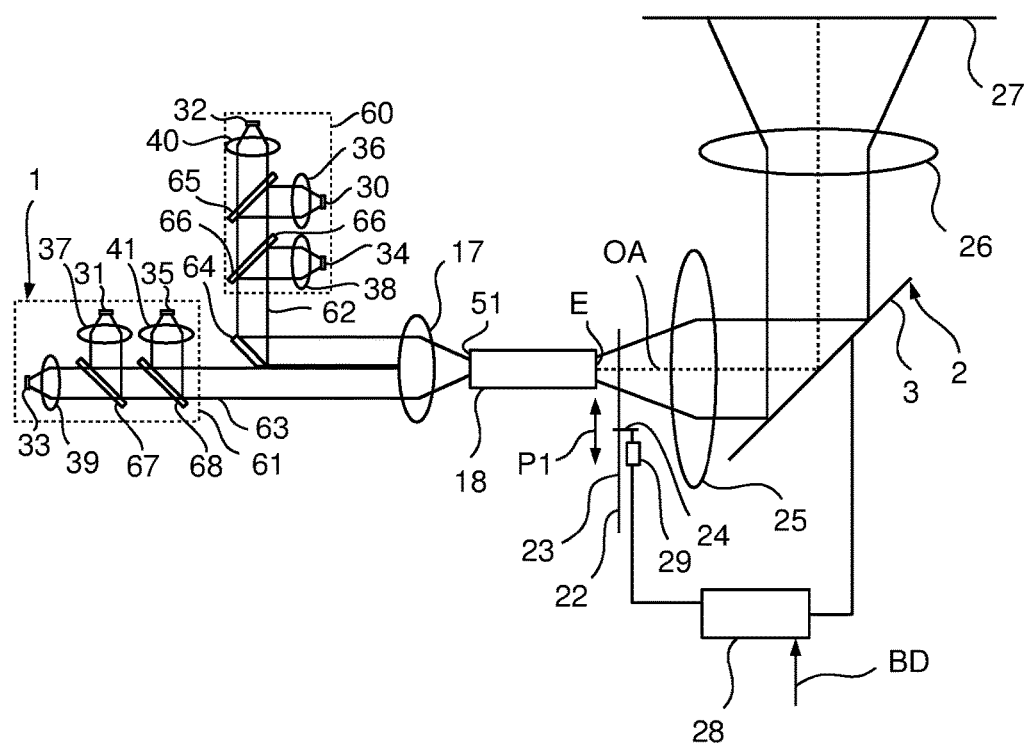
FIG. 9 is an illustration of a further exemplary embodiment of the projector according to the invention together with the illumination module according to the invention.

Alternatively, it is possible to carry out a geometric superposition or beam unification, as shown in the exemplary embodiment according to FIG. 9. In this exemplary embodiment, the illumination apparatus 1 according to the invention comprises two light source units 60, 61, which may have the same embodiment and which are able to emit red, green and blue light as an output beam 62, 63 sequentially in time. The output beams 62, 63 are geometrically superposed to form a combined beam by means of a deflection mirror 64, said combined beam striking the focusing optical unit 17 and being focused into the integrator 18 by the latter.

The first light source unit 60 may comprise the first, third and fifth illumination partial module 30, 32, 34 together with the corresponding collimator optical units 36, 38 and 40. Further, the first light source unit 60 contains a first dichroic beam unifier 65 and a second dichroic beam unifier 66, which may have the same embodiment as the dichroic beam unifiers 16 and 20.

The second light source unit 61 may comprise the second, fourth and sixth illumination partial module 31, 33 and 35 together with the corresponding collimator optical units 37, 39 and 41, and also a third and fourth dichroic beam unifier 67, 68 (which may have the same embodiment as the dichroic beam unifiers 16, 20).

Consequently, the first illumination module 4 comprises the first and the second illumination partial module 30, 31, the second illumination module 5 comprises the third and fourth illumination partial module 32 and 33 and the third illumination module 6 comprises the fifth and sixth illumination partial module 34 and 35.

Once again, the illumination partial modules 30-35 can be actuated by the control unit 28 and the corresponding connection lines are not plotted so as to simplify the illustration.

In a further modification, the broad spectra of the first and/or second solid-state-based illumination module 4, 5 can be manipulated or modified by the optical units 45, 46 illustrated using dashed lines in FIG. 1. By way of example, the optical units 45, 46 may comprise filters, prisms, gratings, etc., which are absorptive or dichroic, for example. Such optical units 45, 46 may be provided in all other described exemplary embodiments.

Figure 10:
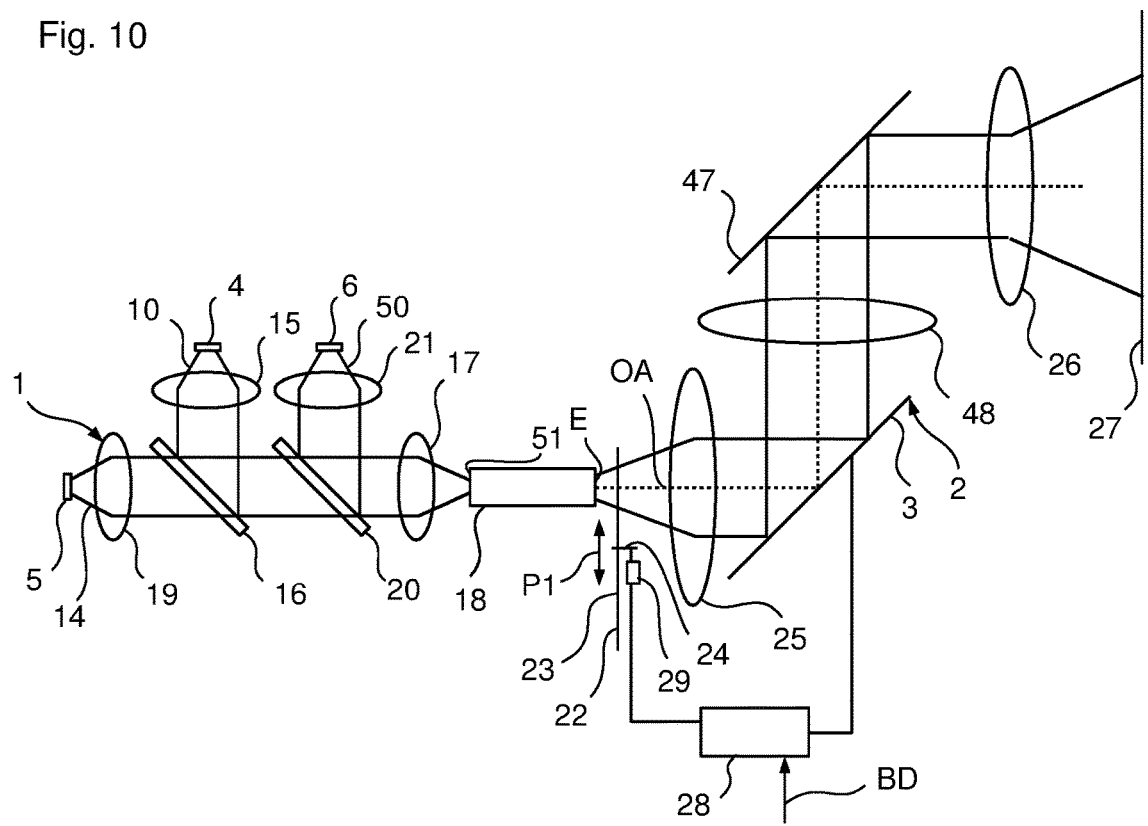
FIG. 10 is an illustration of a further exemplary embodiment of the projector according to the invention with the illumination module according to the invention.

FIG. 10 shows a further exemplary embodiment of the projector 2 according to the invention, which has an improved contrast since a further light modulator 47 is disposed downstream of the light modulator 3. Preferably, an imaging optical unit 48, which images the light modulator 3 on the further light modulator 47, is disposed between the two light modulators 3 and 47. By way of example, the imaging optical unit 48 may be a 1:1 imaging optical unit.

Figure 11:
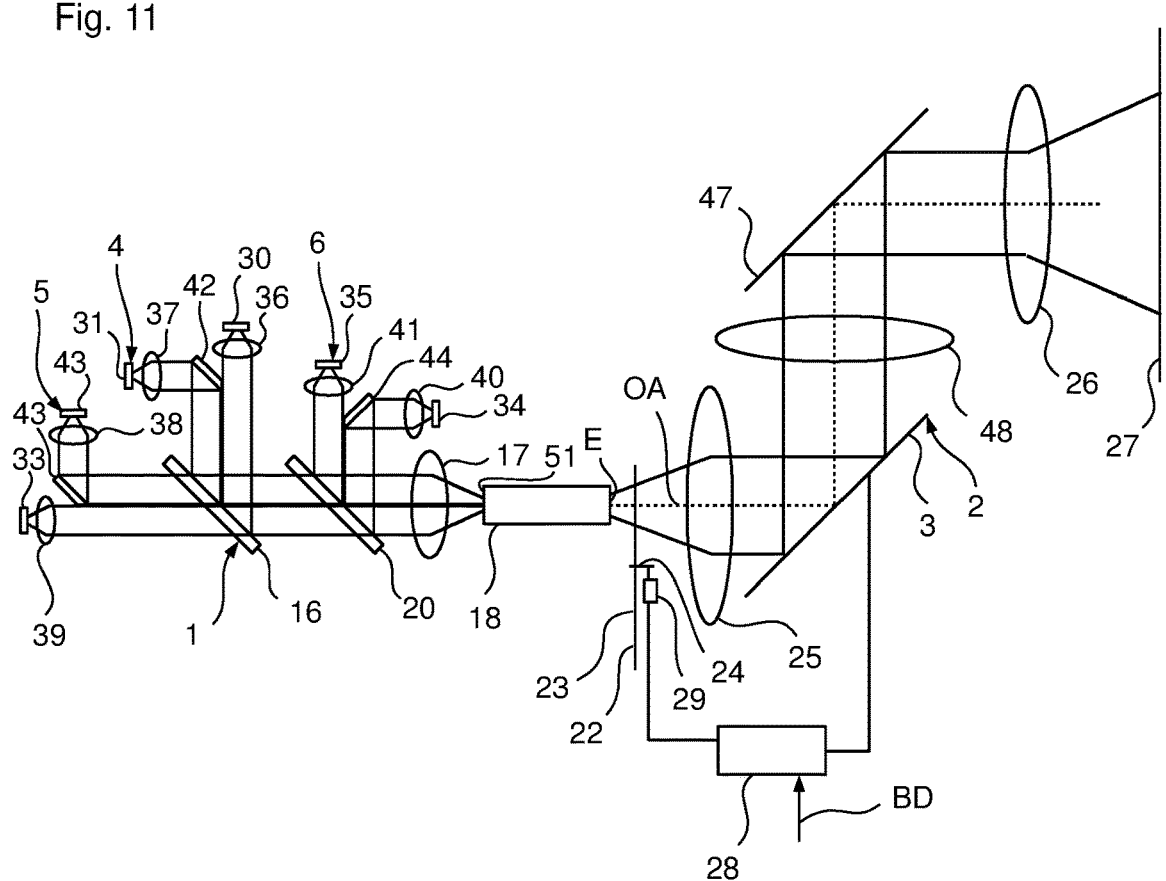
FIG. 11 is an illustration of a further exemplary embodiment of the projector according to the invention with the illumination module according to the invention.

FIG. 11 shows an exemplary embodiment in which the arrangement with the two light modulators 3 and 47 disposed in succession is combined with the illumination apparatus 1 according to FIG. 6. A further exemplary embodiment is shown in FIG. 12, in which the arrangement with the two light modulators 3 and 47 disposed in succession is combined with the illumination apparatus 1 according to FIG. 9.

Figure 12:
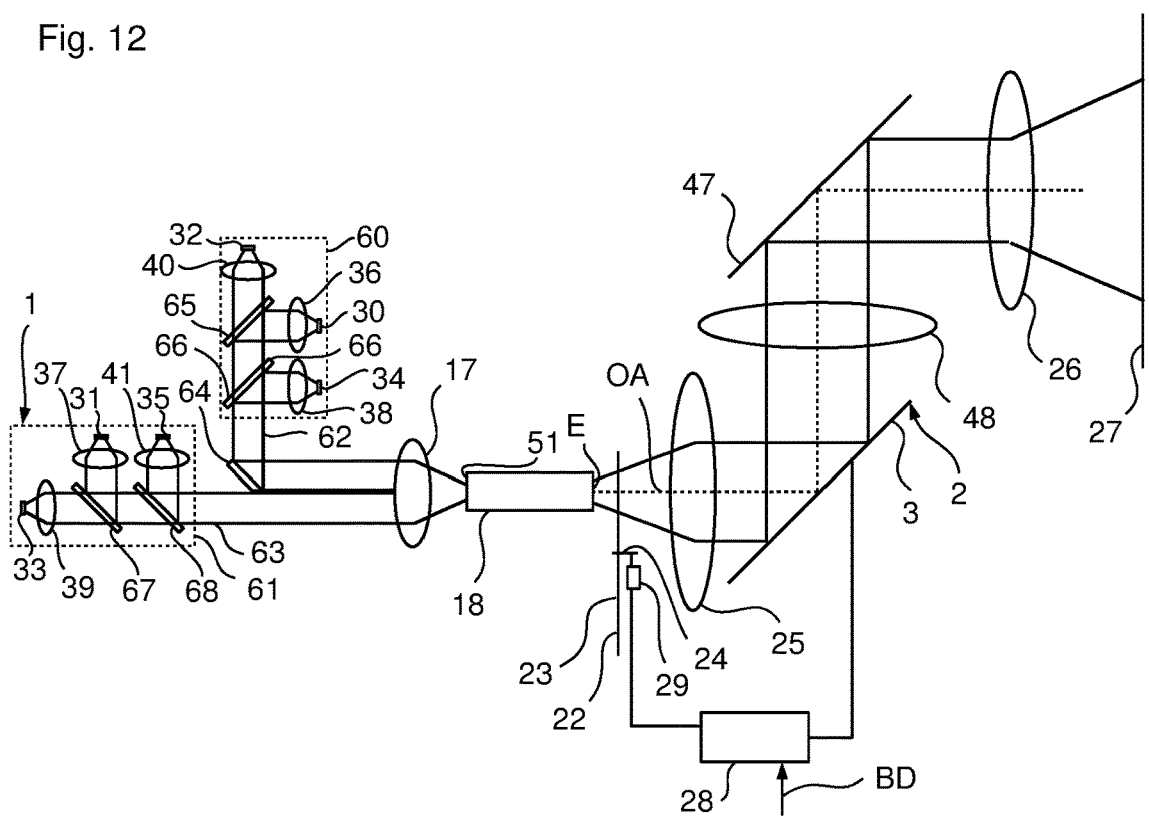
FIG. 12 is an illustration of a further exemplary embodiment of the projector according to the invention with the illumination module according to the invention.

In the exemplary embodiments of FIGS. 10-12, the illumination modules 4-6 and the illumination partial modules 30-35 can be actuated, once again, by the control unit 28, with the corresponding connecting lines not being plotted for the purposes of simplifying the illustration.

Figure 13:
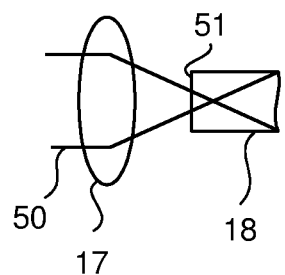
FIG. 13 is an illustration for explaining the paraxial focus of the third illumination module.
Figure 14:
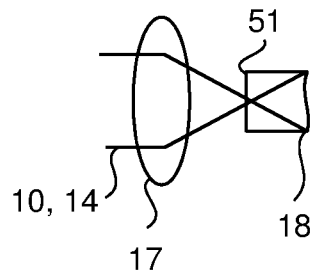
FIG. 14 is a schematic illustration of the paraxial focus of the first and/or second illumination module.

The first to third condenser optical unit 15, 19, 21 can be embodied in conjunction with the focusing optical unit 17 in such a way that the first and second luminescence radiation 10, 14 and the third radiation 50 have their paraxial focus at the same location within the light mixing rod 18 or exactly at the entry surface 51 of the light mixing rod 18. However, it may be advantageous if the paraxial foci of the first and the second luminescence radiation 10, 14 on the one hand and the paraxial focus of the third radiation 50 on the other hand lie at different axial positions (i.e., along the optical axis OA), as illustrated schematically in FIGS. 13 and 14. Here, FIG. 13 shows the paraxial focus of the third radiation 50, which is spaced further from the entry surface 51 of the light mixing rod or integrator 18 than the paraxial focus of the first and second luminescence radiation 10, 14 illustrated in FIG. 14. Here, the assumption is made that the paraxial foci of the first and second luminescence radiation 10, 14 coincide. However, it is also possible that the paraxial foci of the first and second luminescence radiation 10, 14 do not coincide but are likewise spaced apart from one another, with both paraxial foci being positioned within the integrator 8. Here, the distance between the paraxial foci may lie in the mm-range. Thus, for example, the paraxial focus of the third radiation 50 can be spaced apart by 2 mm from the entry surface 51. The paraxial foci of the first and second luminescence radiation 10, 14 may have a smaller distance from the entry surface 51.

As a result of this position of the paraxial foci, it is possible to transfer light with a maximum possible etendue or virtually a maximum etendue. In particular, as much used light as possible can be coupled into the integrator 18. Used light is understood to mean, in particular, the entire spectrally useful part of the light with an aperture angle less than or equal to a maximum aperture angle of the optical unit following the integrator 18.

While the invention has been described in connection with what is presently considered to be the most practical and preferred embodiments, it will be apparent to those of ordinary skill in the art that the invention is not to be limited to the disclosed embodiments. It will be readily apparent to those of ordinary skill in the art that many modifications and equivalent arrangements can be made thereof without departing from the spirit and scope of the present disclosure, such scope to be accorded the broadest interpretation of the appended claims so as to encompass all equivalent structures and products. Moreover, features or aspects of various example embodiments may be mixed and matched (even if such combination is not explicitly described herein) without departing from the scope of the invention.

What is claimed is:

1. An illumination apparatus for a projector comprising a light modulator, the illumination apparatus comprising:
    a first solid-state-based illumination module comprising a first luminescent material and a first solid-state light source, which emits a first excitation radiation directed on the first luminescent material, the latter thereupon emitting first luminescence radiation with a first spectrum;
    a second solid-state-based illumination module comprising a second luminescent material and a second solid-state light source, which emits a second excitation radiation directed on the second luminescent material, the latter thereupon emitting second luminescence radiation with a second spectrum;
    a superposition unit, which couples the first and the second luminescence radiation into an illumination beam path, in which said first and the second luminescence radiation is guided up to the end of the illumination beam path in order to illuminate the light modulator; and
    a filter unit which filters light with a first color from the first luminescence radiation and light with a second color from the second luminescence radiation such that light with the first and the second color is present at the end of the illumination beam path,
    wherein the second spectrum includes an infrared component which is passed on by the filter unit.

2. The illumination apparatus of claim 1, wherein the first spectrum has a first power spectral density and the second spectrum has a second power spectral density, and wherein the first power spectral density overlaps with the second power spectral density by more than 50%.

3. The illumination apparatus of claim 2,
    wherein the first spectrum has a maximum at a first wavelength and the second spectrum has a maximum at a second wavelength, the second wavelength being longer than the first wavelength,
    wherein the first luminescence radiation is provided with a first luminous power and the second luminescence radiation is provided with a second luminous power, and
    wherein the filter unit uses at least 70% of the provided first luminous power for the light with the first color from the first luminescence radiation and uses at most 30% of the provided second luminous power for the light with the second color from the second luminescence radiation.

4. The illumination apparatus of claim 3, wherein the first wavelength corresponds to the color green and the second wavelength corresponds to the color yellow, and wherein the first color is green and the second color is red.

5. The illumination apparatus of claim 1,
    wherein the first spectrum has a maximum at a first wavelength and the second spectrum has a maximum at a second wavelength, the second wavelength being longer than the first wavelength, wherein the first luminescence radiation is provided with a first luminous power and the second luminescence radiation is provided with a second luminous power, and wherein the filter unit uses at least 70% of the provided first luminous power for the light with the first color from the first luminescence radiation and uses at most 30% of the provided second luminous power for the light with the second color from the second luminescence radiation.

6. The illumination apparatus of claim 5, wherein the first wavelength corresponds to the color green and the second wavelength corresponds to the color yellow, and wherein the first color is green and the second color is red.

7. The illumination apparatus of claim 1, wherein the first and/or second solid-state-based illumination module for producing the luminescence radiation is free from moving parts.

8. The illumination apparatus of claim 1, wherein the filter unit comprises a dichroic beam unifier, which is part of the superposition unit at the same time.

9. The illumination apparatus of claim 1, wherein the illumination beam path comprises a light mixing rod, through which the first and the second luminescence radiation passes.

10. The illumination apparatus of claim 1, further comprising a third illumination module emitting third radiation, wherein the third radiation is coupled into the illumination beam path via the superposition unit.

11. The illumination apparatus of claim 1,
wherein the illumination beam path comprises a light mixing rod, through which the first and the second luminescence radiation passes, and
wherein the illumination apparatus further comprises a third illumination module emitting a third radiation,
wherein the third radiation is coupled into the illumination beam path via the superposition unit, and
wherein a paraxial focus of the third radiation lies in the light mixing rod and said paraxial focus is spaced apart from a paraxial focus of the first and/or second luminescence radiation.

12. The illumination apparatus of claim 1, wherein the first solid-state-based illumination module comprises two illumination partial modules, the emitted partial module luminescence radiations of which are combined to a first luminescence beam, from which the filter unit filters the light with the first color.

13. The illumination apparatus of claim 12, wherein the two partial module luminescence radiations extend adjacent to one another and together strike a filter element of the filter unit, which filters out the light with the first color.

14. The illumination apparatus of claim 12, wherein the partial module luminescence radiations each strike separate filter elements of the filter unit, wherein the filter elements filter out light with the first color therefrom in each case and the light with the first color is subsequently combined to form a common beam with the first color.

15. A projector comprising a light modulator and an illumination apparatus, said illumination apparatus comprising:
a first solid-state-based illumination module comprising a first luminescent material and a first solid-state light source, which emits a first excitation radiation directed on the first luminescent material, the latter thereupon emitting first luminescence radiation with a first spectrum;
a second solid-state-based illumination module comprising a second luminescent material and a second solid-state light source, which emits a second excitation radiation directed on the second luminescent material, the latter thereupon emitting second luminescence radiation with a second spectrum;
a superposition unit, which couples the first and the second luminescence radiation into an illumination beam path, in which said radiation is guided up to the end of the illumination beam path in order to illuminate the light modulator; and
a filter unit which filters light with a first color from the first luminescence radiation and light with a second color from the second luminescence radiation such that light with the first and second color is present at the end of the illumination beam path,
wherein the second spectrum includes an infrared component which is passed on by the filter unit.

16. An illumination apparatus for a projector comprising a light modulator, the illumination apparatus comprising:
a first solid-state-based illumination module comprising a first luminescent material and a first solid-state light source, which emits a first excitation radiation directed on the first luminescent material, the latter thereupon emitting first luminescence radiation with a first spectrum;
a second solid-state-based illumination module comprising a second luminescent material and a second solid-state light source, which emits a second excitation radiation directed on the second luminescent material, the latter thereupon emitting second luminescence radiation with a second spectrum;
a superposition unit, which couples the first and the second luminescence radiation into an illumination beam path, in which said first and the second luminescence radiation is guided up to the end of the illumination beam path in order to illuminate the light modulator; and
a filter unit which filters light with a first color from the first luminescence radiation and light with a second color from the second luminescence radiation such that light with the first and the second color is present at the end of the illumination beam path,
wherein the first spectrum has a maximum at a first wavelength and the second spectrum has a maximum at a second wavelength, the second wavelength being longer than the first wavelength,
wherein the first luminescence radiation is provided with a first luminous power and the second luminescence radiation is provided with a second luminous power, and
wherein the filter unit uses at least 70% of the provided first luminous power for the light with the first color from the first luminescence radiation and uses at most 30% of the provided second luminous power for the light with the second color from the second luminescence radiation.

17. The illumination apparatus of claim 16, wherein the first wavelength corresponds to the color green and the second wavelength corresponds to the color yellow, and wherein the first color is green and the second color is red.

18. The illumination apparatus of claim 16, wherein the first spectrum has a first power spectral density and the second spectrum has a second power spectral density, and wherein the first power spectral density overlaps with the second power spectral density by more than 50%.

19. The illumination apparatus of claim 16, further comprising a third illumination module emitting third radiation, wherein the third radiation is coupled into the illumination beam path via the superposition unit.

* * * * *